(12) United States Patent  
Klode et al.

(10) Patent No.: US 6,561,321 B1
(45) Date of Patent: May 13, 2003

(54) ELECTROMECHANICAL PARKING BRAKE

(75) Inventors: Harald Klode, Centerville, OH (US); Larry R. Miller, Springfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/022,041

(22) Filed: Dec. 18, 2001

(51) Int. Cl.⁷ .............................................. F16D 55/08
(52) U.S. Cl. ...................... 188/72.1; 188/156
(58) Field of Search ............................... 188/72.1, 162, 188/72.8, 156, 157, 158, 196, 202

(56) References Cited

U.S. PATENT DOCUMENTS

| | | | |
|---|---|---|---|
| 5,219,049 A | | 6/1993 | Unterborn |
| 5,348,123 A | * | 9/1994 | Takahashi et al. .......... 188/72.1 |
| 5,704,693 A | | 1/1998 | Mackiewicz |
| 5,769,189 A | | 6/1998 | Heibel et al. |
| 6,012,556 A | | 1/2000 | Blosch et al. |
| 6,109,122 A | * | 8/2000 | Bori et al. ................. 188/82.2 |
| 6,139,117 A | | 10/2000 | Shirai et al. |
| 6,173,820 B1 | | 1/2001 | Blosch et al. |
| 6,209,689 B1 | | 4/2001 | Böhm |
| 6,213,259 B1 | | 4/2001 | Hanson et al. |
| 6,267,207 B1 | | 7/2001 | Fleischer et al. |
| 6,273,232 B1 | | 8/2001 | Kimura et al. |
| 6,293,363 B1 | | 9/2001 | Rangaswamy et al. |
| 6,367,593 B1 | * | 4/2002 | Siler et al. ................. 188/72.1 |
| 6,412,610 B1 | * | 7/2002 | Drennen et al. ............ 188/156 |
| 6,471,017 B1 | * | 10/2002 | Booz et al. ................. 188/162 |

* cited by examiner

Primary Examiner—Christopher P. Schwartz
Assistant Examiner—Melanie Torres
(74) Attorney, Agent, or Firm—Scott A. McBain

(57) ABSTRACT

An electric caliper comprises a motor having a shaft, and a gear rotatable with the shaft and having at least one tooth projecting therefrom. A plunger is disposed on the shaft, and has at least one socket engagable with a corresponding tooth on the gear. A magnet disposed proximate the plunger is adapted to draw the plunger in a first axial direction, and a solenoid yoke disposed proximate the plunger is adapted to selectively draw the plunger in a second axial direction.

20 Claims, 2 Drawing Sheets

US 6,561,321 B1

ELECTROMECHANICAL PARKING BRAKE

TECHNICAL FIELD OF THE INVENTION

The present invention relates generally to brakes for motor vehicles, and more particularly to an electromechanical parking brake.

BACKGROUND OF THE INVENTION

A brake system for a motor vehicle, and in particular an automotive vehicle, functionally reduces the speed of the vehicle or maintains the vehicle in a rest position. Various types of brake systems are commonly used in automotive vehicles, including hydraulic, anti-lock or "ABS," and electric or "brake by wire." In a hydraulic brake system, hydraulic fluid transfers energy from a brake pedal to one or more brake pads for slowing down or stopping rotation of a wheel of the vehicle. In an electric brake system, the hydraulic fluid is eliminated. Instead, the application and release of the brake pads is controlled by an electromechanical brake such as an electric caliper.

It is desirable to equip any motor vehicle with a parking brake. To date, however, no fully satisfactory electromechanical parking brake for an electric brake system has been proposed.

SUMMARY OF THE INVENTION

The present invention is an electric caliper comprising a motor having a shaft, and a gear rotatable with the shaft and having at least one tooth projecting therefrom. A plunger is disposed on the shaft, and has at least one socket engagable with a corresponding tooth on the gear. A magnet disposed proximate the plunger is adapted to draw the plunger in a first axial direction, and a solenoid yoke disposed proximate the plunger is adapted to selectively draw the plunger in a second axial direction.

Accordingly, it is an object of the present invention to provide an electric caliper of the type described above with a parking brake feature that is relatively simple and inexpensive to manufacture.

Another object of the present invention is to provide an electric caliper of the type described above with a minimum of moving parts.

Still another object of the present invention is to provide an electric caliper of the type described above that is relatively insensitive to fatigue.

Still another object of the present invention is to provide an electric caliper of the type described above in which a permanent wheel braking force can be achieved without continuous electrical energization of the brake.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
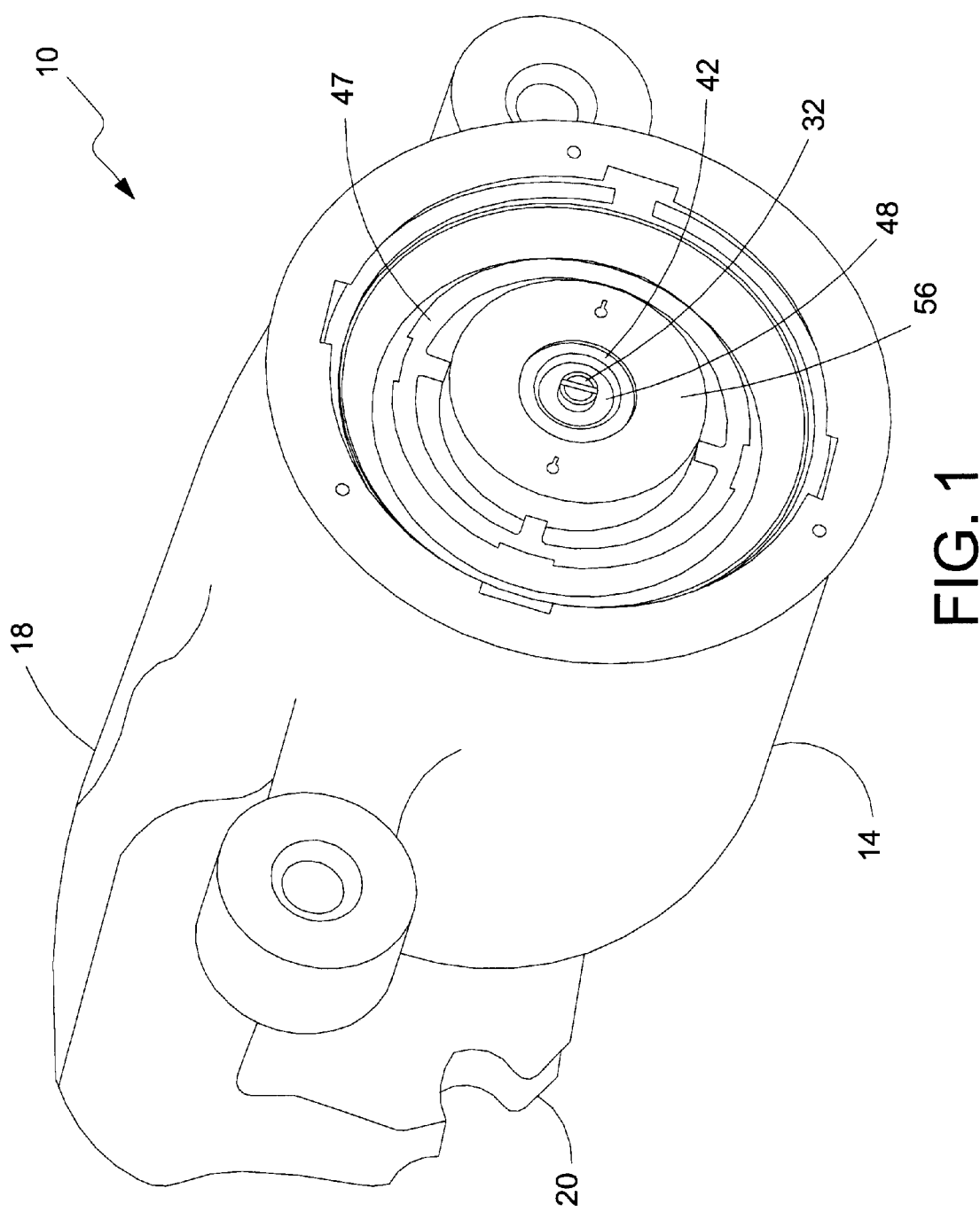
FIG. 1 is a perspective view of an electric caliper according to the present invention.
Figure 2:
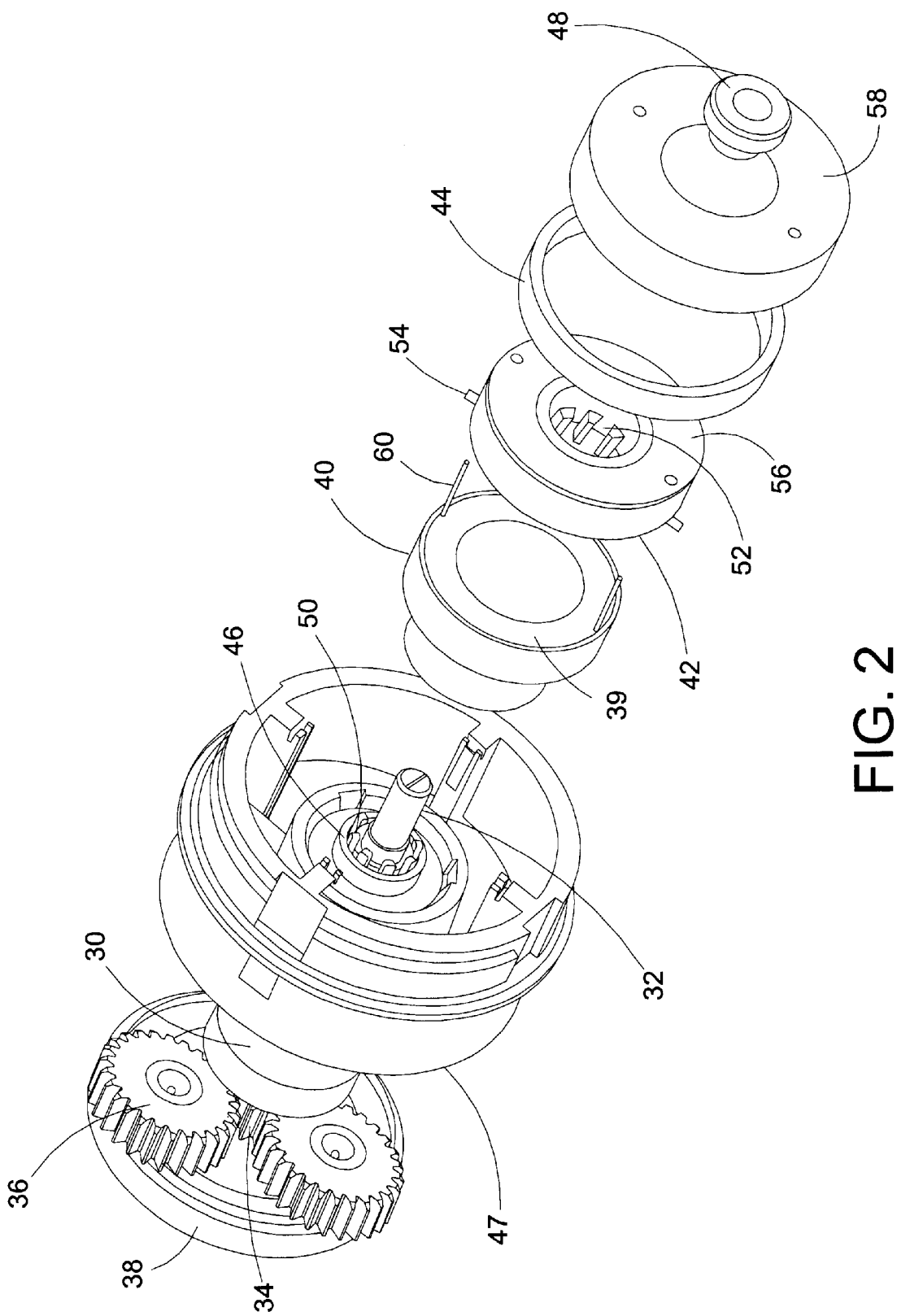
FIG. 2 is an exploded perspective view of a portion of the electric caliper shown in FIG. 1.

FIGS. 1 and 2 show one embodiment of a floating electric caliper 10 according to the present invention for a disc brake system of a motor vehicle. The caliper 10 includes a cylindrical housing 14 and an L-shaped bridge 18 extending transversely from a front end of the housing. The bridge 18 has a leg 20 provided with an outer brake pad, while an opposed inner brake pad extends radially from an inner attachment bracket leg closer to the housing 14. During braking, the inner brake pad engages a disc connected to a wheel of the motor vehicle, and the resulting reactionary force pulls the outer brake pad into engagement with the disc. The engagement of the inner and outer brake pads with the disc retards rotation of the wheel or holds the wheel in a fixed position.

A motor 30 fixedly mounted within the housing 14 controls the engagement of the brake pads according to any known method. In a preferred embodiment, the motor 30 includes an axially extending shaft 32, one end of which drives a first stage sun gear 34. The sun gear 34 rotatably engages a plurality of planetary gears 36. The planetary gears 36 are pinned to a first stage carrier 38, and travel about a ring gear fixed to the housing 14. Further details of this arrangement are set forth in U.S. Pat. No. 6,367,593, filed Aug. 22, 2001 entitled "Electric Caliper Having Splined Ball Screw" by Ernest R. Siler and David B. Drennen, the disclosure of which is hereby incorporated by reference.

The caliper 10 also allows a braking force to be semi-permanently established, an action that is commonly referred to as setting a parking brake. The motor 30 is first energized to rotate the motor shaft 32 until a desired brake clamping force has been reached, which slows down and eventually stops the rotation of the motor shaft while the motor current continues to flow to maintain the required brake clamping force. As soon as the motor shaft has come to a complete stop, a coil 39 of a solenoid yoke 40 is then energized, preferably with a direct current. The resulting magnetic field axially draws a steel plunger 42 on the motor shaft 32 away from a ring magnet 44 and toward a shaft gear 46 disposed within a motor end frame 47. A polymer bearing or bushing 48 minimizes friction between the plunger 42 and the motor shaft 32.

Depending upon their relative orientation, a plurality of undercut teeth 50 on the shaft gear 46 either fully or partially engage correspondingly angled sockets 52 in the plunger 42, or else abut the areas between the sockets. Regardless, the current to the motor 30 is thereafter slowly reduced, which causes the motor shaft 32 to rotate in the opposite direction until the teeth 50 mesh fully with the sockets 52 and the plunger 42 completes its axial travel. The plunger is held against rotation by one or more radially projecting tabs 54 to thereby lock the caliper 10. After the current to the solenoid 40 is shut off, the motor shaft 32 remains in the locked position due to the continued caliper-generated reversal torque to the shaft and the self-locking geometry of the teeth 50 in the sockets 52.

To release the brake, the motor 30 is reenergized in the brake apply direction. This causes the teeth 50 to disengage from the sockets 52 via a cam effect on the backside of the teeth, reinforced by the constant magnetic pull force from the permanent magnet 44. Once the teeth 50 are completely separated from the sockets 52, the plunger 42 axially retracts until it abuts with a non-magnetic spacer 56 features inside a steel housing 58. Inside the housing 58, the plunger 42 is held securely by the magnetic force from the permanent magnet 44. A plurality of magnet wires 60 extend from the coil 39 through holes in the plunger 42 and the housing 58.

Mechanical release mechanisms may also be provided. For instance, a mechanical release cable (not shown) that pulls the plunger 42 axially can be attached to the plunger to allow for manual brake release. Alternatively, a gear and pawl combination may be provided that creates sufficient motor shaft rotation in the brake apply direction to disengage the teeth as described above.

The present invention thus provides an electric caliper with a parking brake feature that is relatively simple and inexpensive. The only moving part of the parking brake feature, the plunger, performs in conjunction with the permanent magnet the function of a spring but is not subject to the same fatigue. Furthermore, the symmetrical layout of the plunger, and the fact that the motion of the plunger is perpendicular to travel of the motor vehicle suspension, minimizes the parasitic force on the plunger in the direction of vehicle suspension travel to prevent accidental release of the plunger when the parking brake is meant to be disengaged.

While the embodiment of the invention disclosed herein is presently considered to be preferred, various changes and modifications can be made without departing from the spirit and scope of the invention. For instance, slots may be provided in the periphery of the plunger to serve as the anti-rotation feature, or a permanent magnet with annular pole pieces and a non-magnetic housing may be substituted for the like parts described above. The scope of the invention is indicated in the appended claims, and all changes that come within the meaning and range of equivalents are intended to be embraced therein.

What is claimed is:

1. An electric caliper comprising:
   a motor having a shaft;
   a gear rotatable with the shaft, the gear having at least one tooth projecting therefrom;
   a plunger disposed on the shaft, the plunger having at least one socket engagable with a corresponding tooth on the gear;
   a magnet disposed proximate the plunger and adapted to draw the plunger in a first axial direction; and
   a solenoid yoke disposed proximate the plunger and adapted to selectively draw the plunger in a second axial direction.

2. The electric caliper of claim 1 further comprising a spacer disposed proximate the plunger.

3. The electric caliper of claim 2 wherein the spacer is non-magnetic.

4. The electric caliper of claim 1 further comprising a bearing disposed between the shaft and the plunger.

5. The electric caliper of claim 1 further comprising a polymer bearing disposed between the shaft and the plunger.

6. The electric caliper of claim 1 further comprising a housing disposed around the shaft.

7. The electric caliper of claim 6 wherein the housing comprises magnetically soft steel.

8. The electric caliper of claim 6 wherein the plunger is seatable with the housing.

9. The electric caliper of claim 1 wherein the at least one tooth projects from the gear at an angle.

10. The electric caliper of claim 1 wherein the plunger includes at least one tab projecting radially therefrom.

11. The electric caliper of claim 1 wherein the magnet is a permanent magnet.

12. An electric caliper comprising:
    an electric motor having a shaft defining an axis;
    a gear rotatable with the shaft, the gear having at least one tooth projecting therefrom at an angle to the shaft axis;
    a plunger disposed on the shaft, the plunger having at least one socket engagable with a corresponding tooth on the gear;
    a magnet disposed proximate the plunger and adapted to draw the plunger in a first axial direction; and
    a solenoid yoke disposed proximate the plunger and adapted to selectively draw the plunger in a second axial direction generally opposite to the first axial direction.

13. The electric caliper of claim 12 further comprising a non-magnetic spacer disposed proximate the plunger.

14. The electric caliper of claim 12 further comprising a polymer bearing disposed between the shaft and the plunger.

15. The electric caliper of claim 12 further comprising a magnetically soft steel housing disposed around the shaft.

16. The electric caliper of claim 15 wherein the plunger is seatable with the housing.

17. The electric caliper of claim 12 wherein the at least one tooth projects from the gear to define an undercut.

18. The electric caliper of claim 12 wherein the plunger includes at least one tab projecting radially therefrom.

19. The electric caliper of claim 12 wherein the magnet is a permanent magnet.

20. An assembly for applying brakes for a motor vehicle, the assembly comprising:
    a caliper;
    an electric motor adapted to bias the caliper to apply the brakes, the motor having a shaft defining an axis;
    a gear rotatable with the shaft, the gear having at least one tooth projecting therefrom at an angle to the shaft axis;
    a plunger disposed on the shaft, the plunger having at least one socket engagable with a corresponding tooth on the gear;
    a permanent magnet disposed proximate the plunger and adapted to draw the plunger in a first axial direction; and
    a solenoid yoke disposed proximate the plunger and adapted to selectively draw the plunger in a second axial direction generally opposite to the first axial direction.

* * * * *

UNITED STATES PATENT AND TRADEMARK OFFICE
CERTIFICATE OF CORRECTION

PATENT NO. : 6,561,321 B1
DATED : May 13, 2003
INVENTOR(S) : Harald Klode and Larry R. Miller It is certified that error appears in the above-identified patent and that said Letters Patent is hereby corrected as shown below:

<u>Column 1,</u>
Line 2, please add the following paragraph before "TECHNICAL FIELD OF THE INVENTION";

-- This invention was made in the performance of a Cooperative Research and Development Agreement with the Department of the Air Force. The Government of the United States has certain rights to use the invention. --

Signed and Sealed this

Twentieth Day of January, 2004

JON W. DUDAS
*Acting Director of the United States Patent and Trademark Office*